United States Patent
Mekhtiche et al.

(10) Patent No.: US 10,485,171 B1
(45) Date of Patent: Nov. 26, 2019

(54) TREE HARVESTING TOOL

(71) Applicant: KING SAUD UNIVERSITY, Riyadh (SA)

(72) Inventors: Mohamed Amine Mekhtiche, Riyadh (SA); Mansour Mohammed A. Alsulaiman, Riyadh (SA); Hassan Ismail H. Mathkour, Riyadh (SA); Mohamed Abdelkader Bencherif, Riyadh (SA); Mohammed Faisal Abdulqader Naji, Riyadh (SA); Mohammed Mahdi Algabri, Riyadh (SA); Ghulam Muhammad, Riyadh (SA); Abdul Wadood, Riyadh (SA); Hamid Abdulsalam Ghaleb, Riyadh (SA); Khalid Nasser Almutib, Riyadh (SA); Hedjar Tahar Ramdane, Riyadh (SA); Amin Umar Syed, Riyadh (SA); Fadl Dahan Naji, Riyadh (SA); Hamdi Taher Altaheri, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/425,850

(22) Filed: May 29, 2019

(51) Int. Cl.
*A01D 46/30* (2006.01)
*A01D 46/22* (2006.01)

(52) U.S. Cl.
CPC ............ *A01D 46/30* (2013.01); *A01D 46/22* (2013.01)

(58) Field of Classification Search
CPC ........ A01D 46/22; A01D 46/30; A01D 46/20; A01D 46/24; A01D 46/26; A01D 45/002; A01D 2046/262
See application file for complete search history.

(56) References Cited

U.S. PATENT DOCUMENTS

| 2,504,856 | A |   | 4/1950 | Luplow |             |
|-----------|---|---|--------|--------|-------------|
| 3,272,282 | A | * | 9/1966 | Sanders | A01D 46/20 |
|           |   |   |        |        | 182/113     |
| 4,074,819 | A | * | 2/1978 | Labourre | A01D 46/20 |
|           |   |   |        |        | 182/131     |

(Continued)

FOREIGN PATENT DOCUMENTS

| DE | 2200025 A1 * | 7/1973 | ............. A01D 46/20 |
| DE | 3509159 A1   | 9/1986 | |

(Continued)

*Primary Examiner* — Alicia Torres
*Assistant Examiner* — Adam J Behrens
(74) *Attorney, Agent, or Firm* — Richard C. Litman; Nath, Goldberg & Meyer

(57) ABSTRACT

The tree harvesting tool is a tool adapted for attachment to a conventional lifter or lifting device for performing harvesting and pre-harvesting operations on a fruit tree. The tree harvesting tool includes a cylindrical shell, having an upper end and a lower end, at least one portion of the cylindrical shell defining a door. The cylindrical shell is adapted for encircling the trunk of the tree. A plurality of panels are pivotally secured to the lower end of the cylindrical shell to define an openable floor having a central opening for receiving the trunk of the tree. A circular track is mounted on the upper end of the cylindrical shell, such that a movable platform may be mounted thereon. A robotic arm is mounted on the movable platform for selectively operating and manipulating a tool for performing tree harvesting and pre-harvesting operations.

20 Claims, 16 Drawing Sheets

(56) References Cited

U.S. PATENT DOCUMENTS

| | | | | |
|---|---|---|---|---|
| 5,301,459 A | * | 4/1994 | Eliachar | A01D 46/20 144/208.2 |
| 5,426,927 A | * | 6/1995 | Wang | A01D 46/24 56/328.1 |
| 5,438,793 A | * | 8/1995 | Eliachar | A01D 46/20 144/208.2 |
| 8,381,501 B2 | * | 2/2013 | Koselka | A01D 46/30 56/10.2 A |
| 2005/0091957 A1 | | 5/2005 | Stanners et al. | |
| 2016/0073584 A1 | * | 3/2016 | Davidson | A01D 46/30 56/328.1 |

FOREIGN PATENT DOCUMENTS

| | | | | |
|---|---|---|---|---|
| EP | 0580248 A1 | * | 1/1994 | A01D 46/20 |
| EP | 0580248 A1 | | 1/1994 | |
| GB | 2123382 A | * | 2/1984 | A01D 46/20 |
| JP | 2006061162 A | | 3/2006 | |
| WO | 2011126354 A2 | | 10/2011 | |

* cited by examiner

TREE HARVESTING TOOL

BACKGROUND

1. Field

The disclosure of the present patent application relates to tree and fruit harvesting, and particularly to a tree harvesting tool for performing harvesting and pre-harvesting operations near the crown of a tree, especially a date palm tree.

2. Description of the Related Art

Traditionally, there are several steps involved in harvesting the fruit from tall trees, such as date palm trees. For short, young palms (1-3.5 m tall), a sharp flat blade attached to the end of a steel water pipe is commonly used to cut the fruit. To cut a fresh fruit bunch, a cutter accelerates the blade into the fresh fruit bunch stalk with an underhanded upward motion. The weight of the water pipe provides enough inertia and stored energy to sever the stalk. For older, taller palms (3.5-15 m tall), a sharp blade (roughly the size and shape of a hand scythe blade) attached to the end of a long (13+m) adjustable pole is used. The cutter carries the pole upright. It is physically taxing to raise and lower the pole because of its length. When the cutter identifies a ripe fruit, he maneuvers the blade around the top of the fresh fruit bunch stalk and cuts it with a vigorous downward pull on the pole. The fruit falls to the ground and, depending on the height, a number of fruitlets (i.e., loose fruit) will separate from the fresh fruit bunch upon impact. Loose fruit is, by weight, the most valuable part of the harvest.

Once the fruit is cut, the next step of harvesting involves the in-field collection, which is achieved by a second laborer, manually collecting and carrying the fresh fruit bunch to a haul road in a sling or on his or her shoulder. The fruit is then carried to the haul road and left at a fresh fruit bunch pile. The final stage of harvesting involves moving the fruit from the haul road by a tractor pulling a trailer, along with several chargers (i.e., laborers equipped with spears or spikes) who travel down the roads stopping to pick up fruit at row ends, spearing the fruit with spikes and throwing them over the side of the wagon. When the wagon is full, the tractor pulls it to a chute area where the fruit is dumped, much like the action of a dump truck. Trucks from the mill back under a chute and a tractor equipped with a front-end loader pushes fruit down the chute onto the truck. This process is inherently inefficient, since the fruit is handled three times, often causing damage to the fruit each time. Further, the rate of collection is not well matched to the rate of cutting. The tall palm cutter is slow, so the collector's work rate is also slow and he is underutilized, whereas the short palm collector is typically overworked.

There are presently several options to mechanize the collection of palm fruit. A mechanical buffalo, which is a simple three-wheel carrier with a 400 kg payload and a dump bin, has been used in the collection of the fruit once it has been cut, as described above. To collect fruit, one or two chargers travel down the travel rows after the fruit is cut, using spikes to spear fresh fruit bunch and load the fruit into the mechanical buffalo's dump bin. When full, the load is dumped at the haul road and the rest of the evacuation process to the mill is as described above. If loose fruit is collected, it is a separate operation, since the fresh fruit bunch collection process is too fast for loose fruit collection. This process has proven to be more efficient than hand carrying by reducing the direct labor content and substituting capital.

Another option for collecting fruit is the use of a mini-tractor/grabber, which is a mini-tractor equipped with a hydraulic grabber, towing a scissor lift trailer. The operator drives down the palm rows using the grapple to pick up fruit in front of him, and deposits it in the trailer behind him. As with the mechanical buffalo, a separate operation is required to retrieve the loose fruit. When the trailer is full, it is driven to a large over-the-road trailer that is placed in the field at a convenient location.

Articulating boom lifts have also been used, but they cannot be operated quickly, nor can they travel over the ground quickly with an operator in them. They are constructed as, essentially, a mass at the end of a cantilevered beam and would result in unacceptable jostling of the cutter when moving between trees. Telescoping boom lifts are equally ineffective, since they are prohibitively heavy and slow to operate. In addition, they cannot access the back side of a palm, thus requiring them to be maneuvered on the ground to a place where the fruit is accessible. Thus, a tree harvesting tool solving the aforementioned problems is desired.

SUMMARY

The tree harvesting tool is a tool adapted for attachment to a conventional lifter or lifting device for performing harvesting and pre-harvesting operations on a fruit tree, such as a date palm tree. The tree harvesting tool includes a cylindrical shell, having an upper end and a lower end, at least one portion of the cylindrical shell defining a door. The cylindrical shell is adapted for encircling the trunk of the tree. A plurality of panels are pivotally secured to the lower end of the cylindrical shell to define an openable floor with a central opening for receiving the trunk of the tree. A circular track is mounted on the upper end of the cylindrical shell, such that a movable platform may be mounted thereon and be selectively driven to move to a desired position on the circular track. A robotic arm is mounted on the movable platform for selectively operating and manipulating a tool for performing tree harvesting and pre-harvesting operations. It should be understood that the harvesting and pre-harvesting operations may include a wide variety of operations. Examples of such operations include, but are not limited to, dethroning, pollination, bunch alignment, bunch attaching, tree thinning, dust removal, date spider removal, bagging, harvesting palm date bunches, harvesting palm dates, as well as common post-harvesting operations.

In an alternative configuration, a fruit bagger may be mounted on the movable platform for bagging fruit hanging from the tree. In this alternative configuration, the robotic arm is removed and replaced by the fruit bagger. The fruit bagger includes a vertical support having at least one vertical rail, with a sliding support being slidably mounted thereon. A cylindrical bag shaper is mounted on the sliding support for encircling the fruit hanging from the tree. A supply of bagging material is also mounted on the sliding support, such that the bagging material may be wrapped around the cylindrical bag shaper to form a bag for bagging the fruit.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
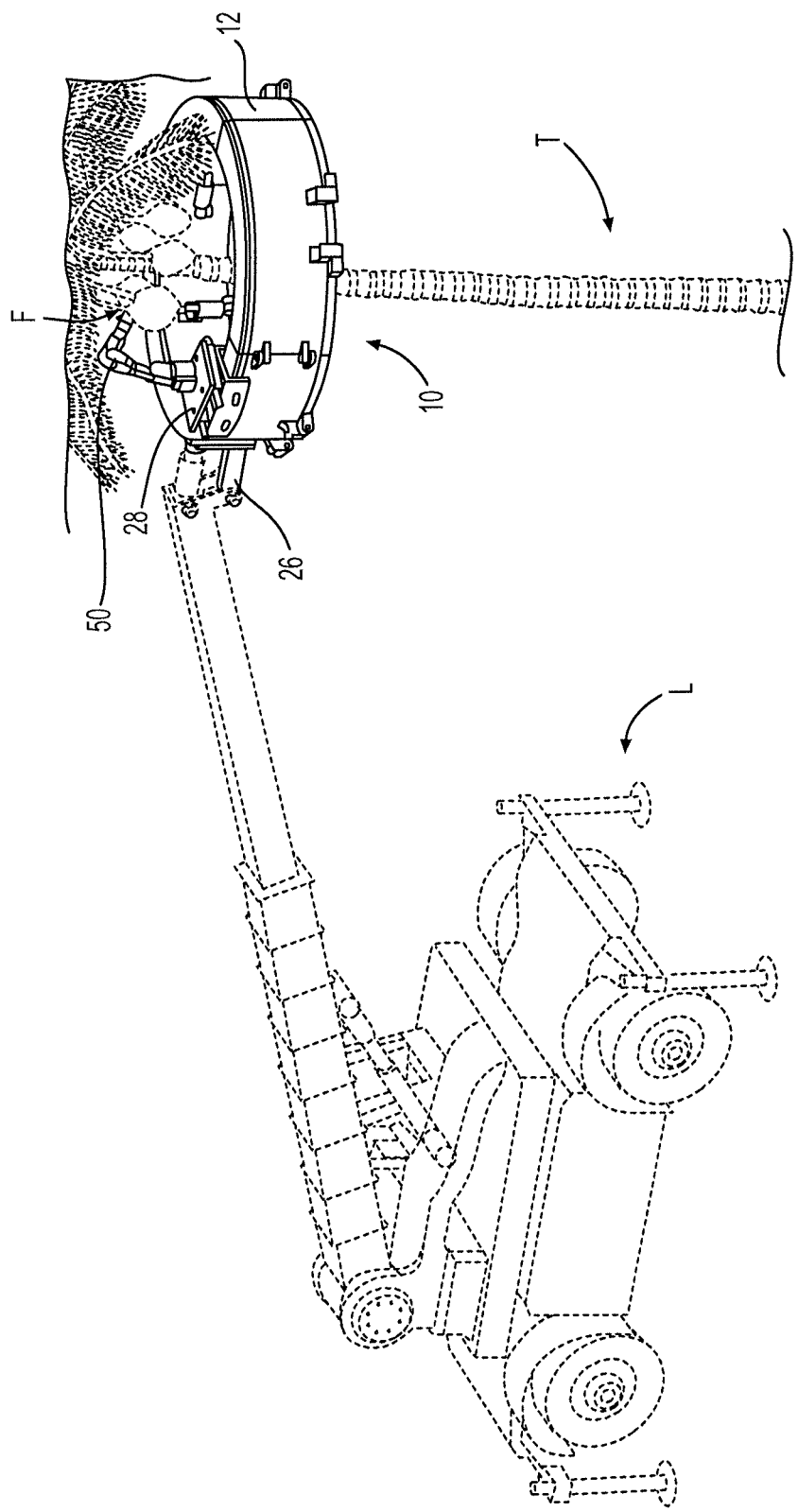
FIG. 1 is an environmental perspective view of a tree harvesting tool.
Figure 2:
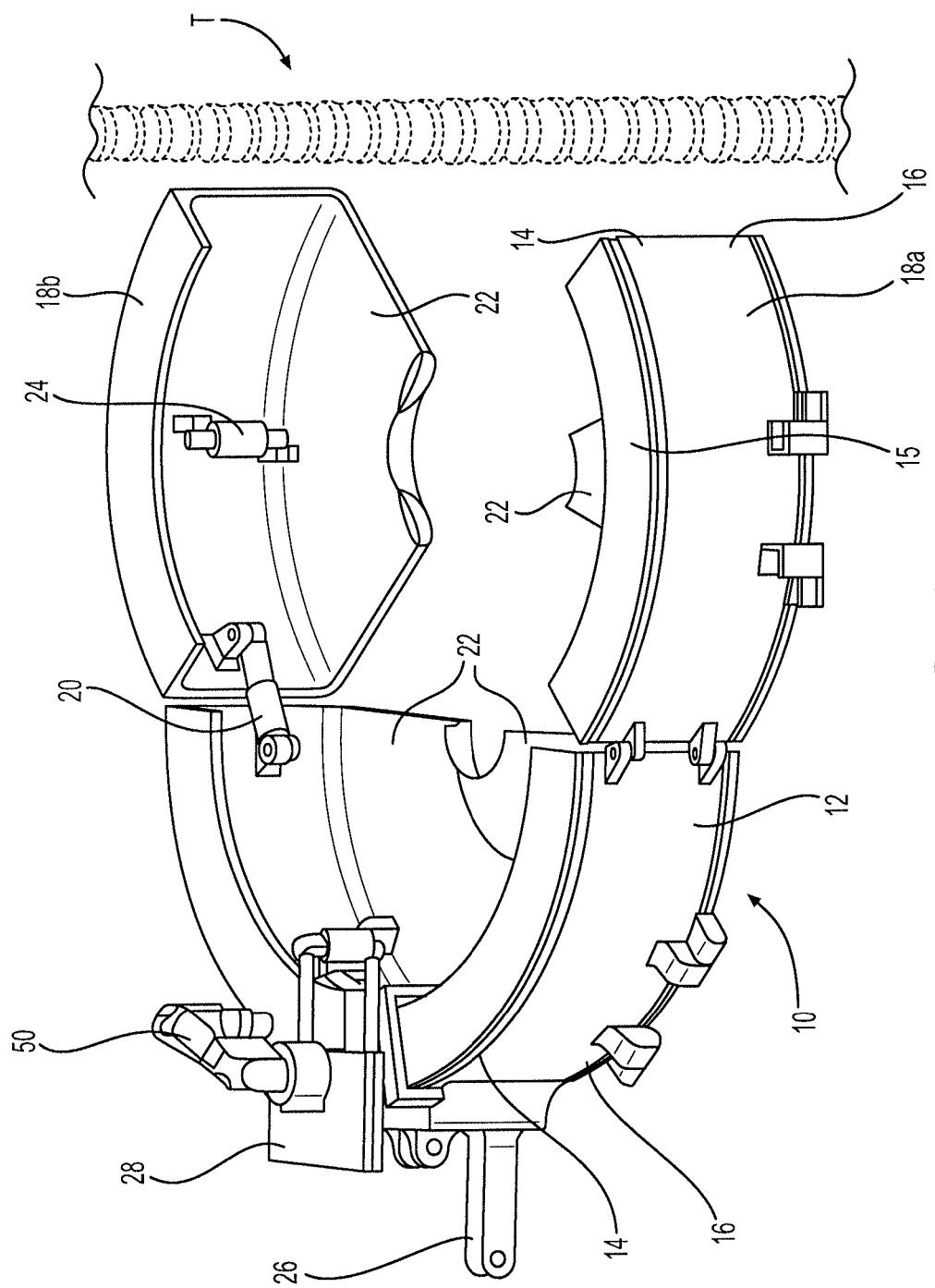
FIG. 2 is a perspective view of the tree harvesting tool, shown in an open configuration.
Figure 3:
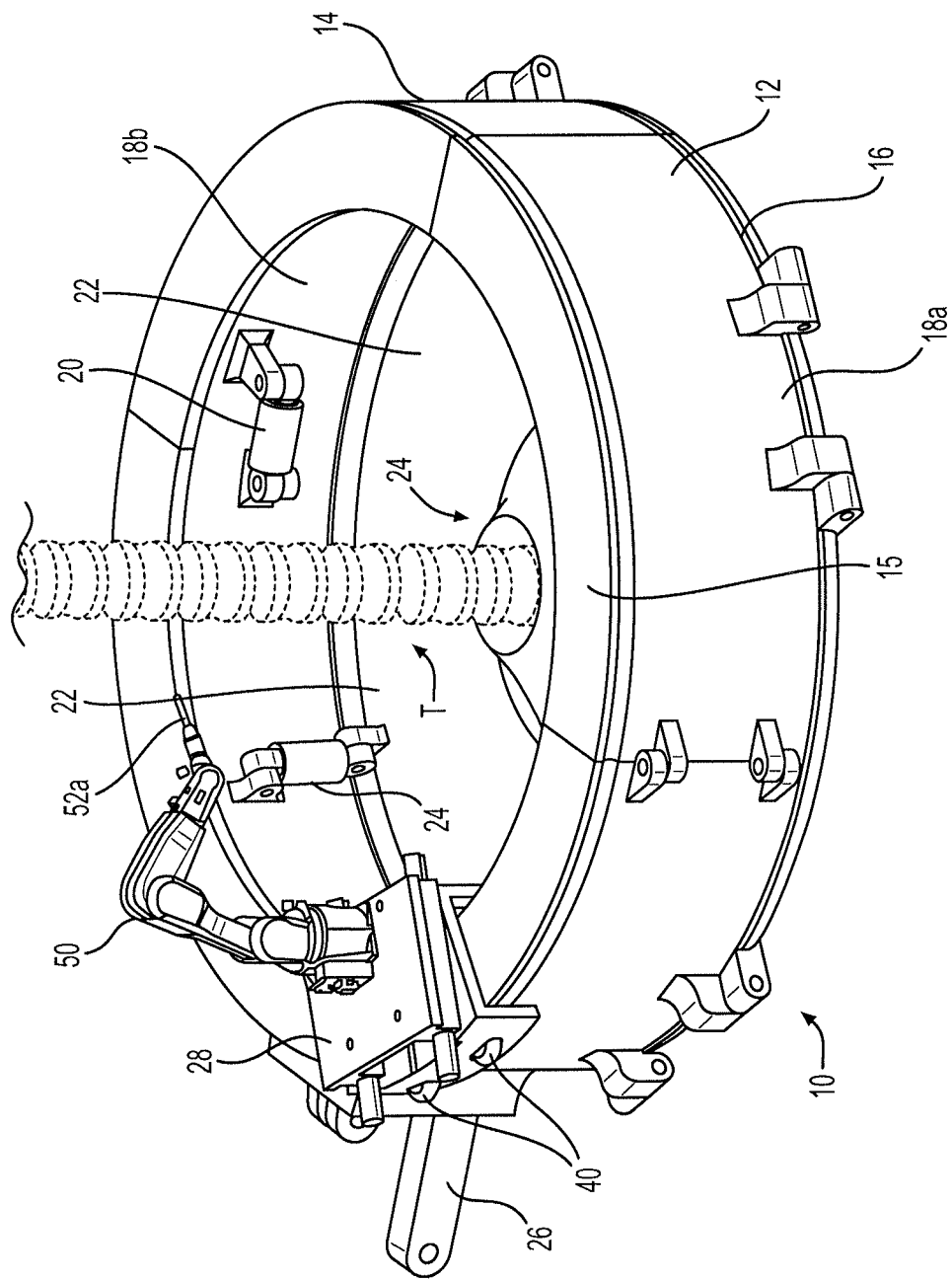
FIG. 3 is an environmental perspective view of the tree harvesting tool, shown in a closed configuration.

The tree harvesting tool 10 is a tool adapted for attachment to a conventional lifter or lifting device for performing harvesting and pre-harvesting operations on a fruit tree, such as the date palm tree T of FIG. 1. It should be understood that the date palm tree T and its fruit F are shown for exemplary purposes only. As shown in FIGS. 1-3, the tree harvesting tool 10 includes a cylindrical shell 12, having an upper end 14 and a lower end 16, at least one portion of the cylindrical shell 12 defining a door. In FIG. 2, two doors 18a, 18b are shown, although it should be understood that any desired number of doors in any suitable locations and having any suitable configuration may be utilized. It should be understood that the harvesting and pre-harvesting operations may include a wide variety of operations. Examples of such operations include, but are not limited to, dethroning, pollination, bunch alignment, bunch attaching, tree thinning, dust removal, date spider removal, bagging, harvesting palm date bunches, harvesting palm dates, as well as common post-harvesting operations.

In FIG. 1, the tree harvesting tool 10 is shown attached to a conventional lifter L by an attachment mechanism 26, which is secured to the cylindrical shell 12. It should be understood that the lifter L is shown for exemplary purposes only, and that the tree harvesting tool 10 may be lifted and moved by any suitable type of lifter or lifting device. Further, it should be understood that the configuration of the attachment mechanism 26 may vary, depending upon the particular type of lifter or lifting mechanism being used.

At least one actuator, such as first hydraulic jacks 20 (shown in FIGS. 2 and 3), may be provided for selectively opening the doors 18a, 18b. Although only a single first hydraulic jack 20 can be seen in FIG. 2, it should be understood that each of doors 18a, 18b has a corresponding actuator associated therewith for selectively opening and closing the portions 18a, 18b of cylindrical shell 12 that define doors. As shown in FIGS. 1 and 2, the cylindrical shell 12 is adapted for encircling the trunk of the tree T. As best seen in FIGS. 2 and 3, a plurality of panels 22 are pivotally secured to the lower end 16 of the cylindrical shell 12 to define an openable floor having a central opening for receiving the trunk of the tree T. A plurality of actuators, such as second hydraulic jacks 24, are provided for selectively pivoting the plurality of panels 22. In FIG. 2, four such panels 22 are shown, although it should be understood that any desired number of panels 22 may be utilized. Although only a single second hydraulic jack 24 can be seen in FIG. 2, it should be understood that each panel 22 has a corresponding actuator associated therewith for selectively opening and closing the panels 22.

Figure 10:
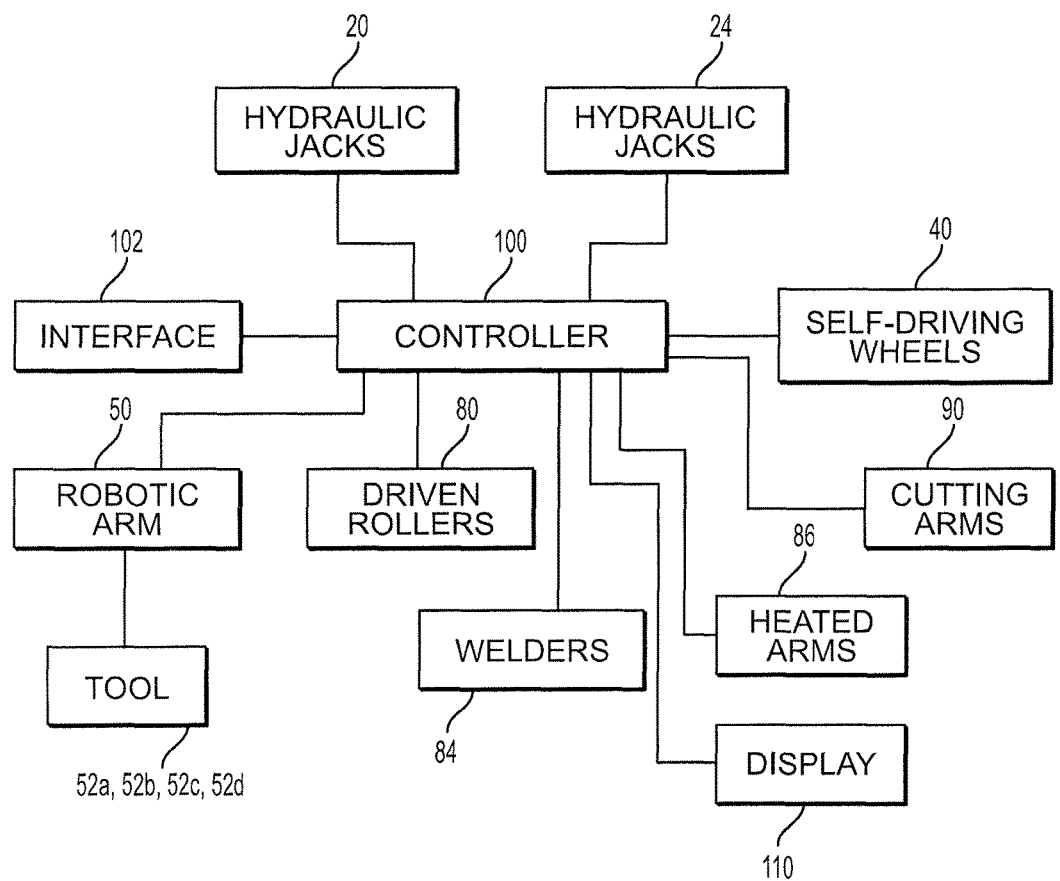
FIG. 10 is a block diagram of a control system of the tree harvesting tool.

First hydraulic jacks 20 and second hydraulic jacks 24 may be selectively actuated through connection with a controller 100, as shown in FIG. 10. Controller 100 may be any suitable type of controller, such as a computer, microprocessor, programmable logic controller or the like, and may be connected with a hydraulic controller or hydraulic valves for controlling the jacks 20, 24. Controller 100 may be mounted on lifter L or may be remote from lifter L. It should be understood that any suitable type of controller, and any suitable type of controller interface 102, may be used. Controller 100 may communication with the first and second hydraulic jacks 20, 24, as well as a further set of controllable elements, as will be described in detail below, through any suitable type of communication, such as conventional wired or wireless communication, for example.

Figure 4:
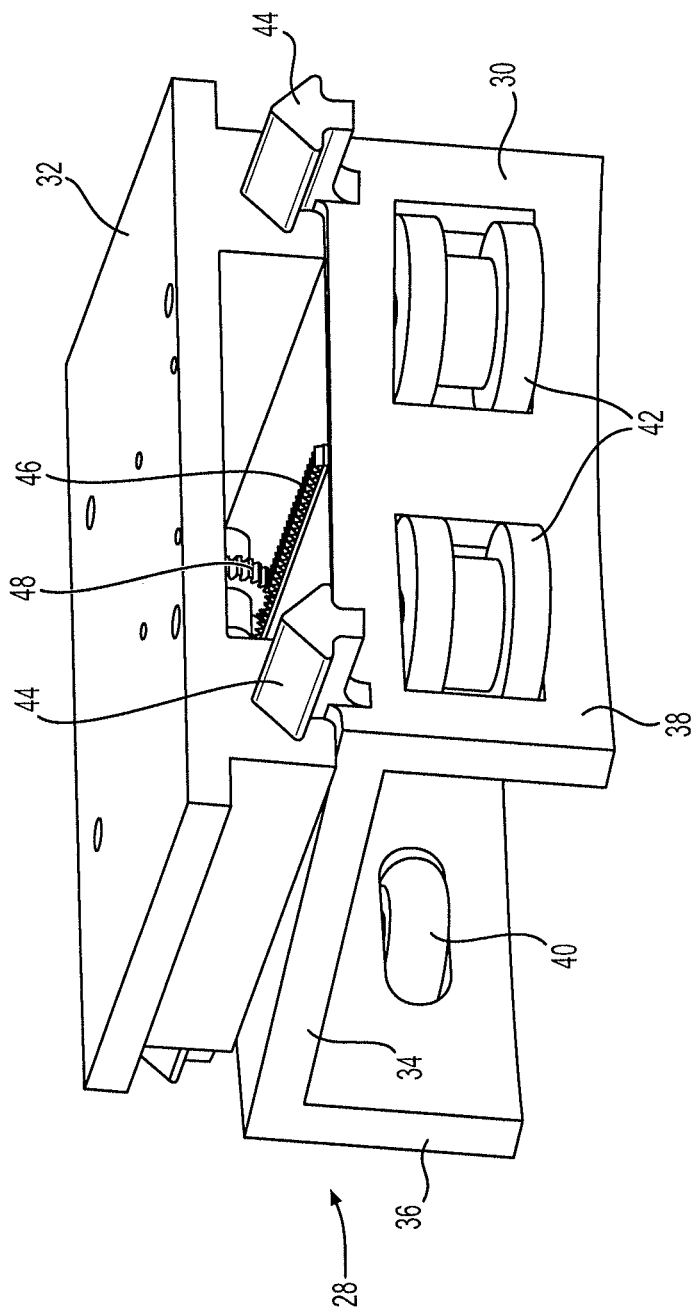
FIG. 4 is a perspective view of a movable platform of the tree harvesting tool.

A circular track 15 is mounted on the upper end 14 of the cylindrical shell 12, such that a movable platform 28 may be mounted thereon and be selectively driven to move to a desired position on the circular track 15. As best shown in FIG. 4, the movable platform 28 includes a lower portion 30 and an upper portion 32. The upper portion 32 is adjustable in a radial direction with respect to the lower portion 30, allowing the upper portion 32 to be selectively moved toward or away from the trunk of tree T.

The lower portion 30 of the movable platform 28 includes a horizontally-extending plate 34 and first and second vertically-extending walls 36, 38, respectively, secured thereto and extending downward therefrom. The first and second vertically-extending walls 36, 38 are spaced apart from one another to receive the circular track 15 and at least a portion of the cylindrical shell 12 therebetween, as shown in FIG. 3. At least one self-driving wheel 40 is rotatably mounted to the first vertically-extending wall 36. The at least one self-driving wheel 40 contacts an exterior face of the cylindrical shell 12 for selectively driving movement of the movable platform 28 about the circular track 15. It should be understood that the at least one self-driving wheel 40 may be any suitable type of self-propelled, motorized wheel, such as those commonly found in motorized scooters, motorized skateboards and the like.

At least one non-driven roller wheel 42 may be mounted to the second vertically-extending wall 38 for making contact with an inner face of the cylindrical shell 12. It should be understood that the positioning of the at least one self-driving wheel 40 and the at least one non-driven roller wheel 42 may be reversed. The at least one self-driving wheel may be selectively controlled through interconnection with controller 100. Further, it should be understood that the number, appearance and overall configurations of wheels 40, 42 are shown for exemplary purposes only. Similarly, it should be understood that the overall configuration and relative dimensions of the movable platform 28 are shown for exemplary purposes only.

At least one rail 44 is mounted on the horizontally-extending plate 34 of the lower portion 30 of the movable platform 28. The upper portion 32 of movable platform 28 is selectively slidable on the at least one rail 44 through the use of any suitable type of drive mechanism, actuator or the like. For example, a linear gear 46 may be mounted on the horizontally extending plate 34 for engaging a rotating gear 48. In this example, rotating gear 48 is selectively driven to rotate by a motor (not shown) mounted to the upper portion 32, thus driving the upper portion 32 to selectively move back and forth in the radial direction. The driving of the upper portion 32 of movable platform 28 may be controlled through interconnection with controller 100.

Figure 5:
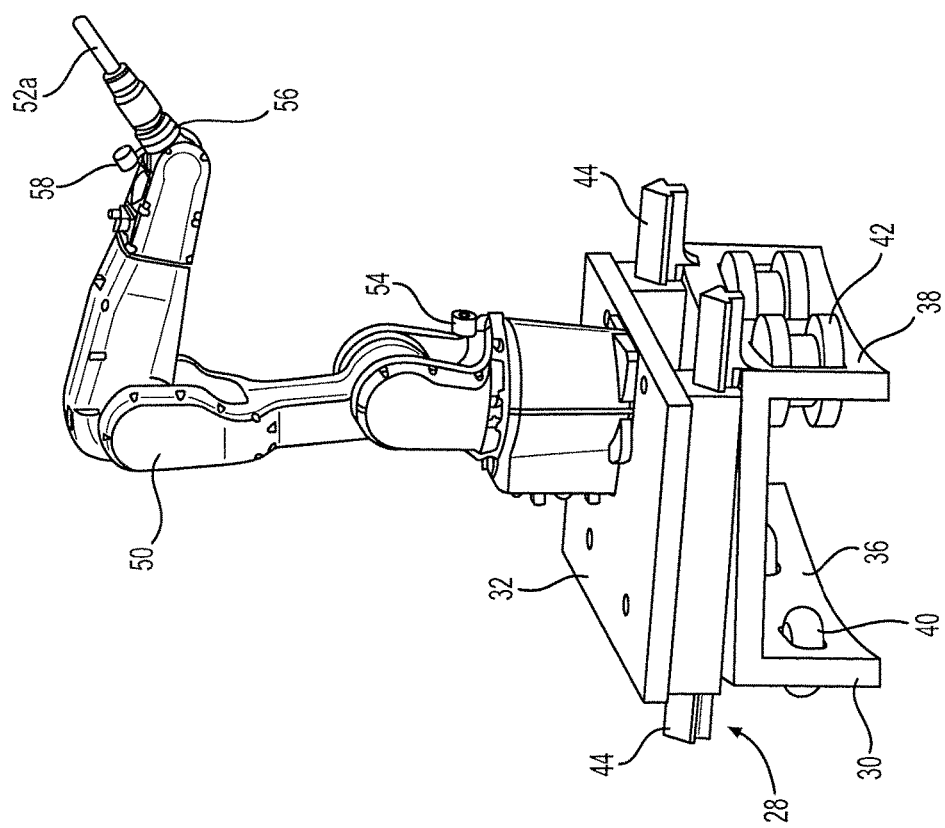
FIG. 5 is a perspective view of a robotic arm and associated tool mounted on the movable platform of FIG. 4.
Figure 6A:
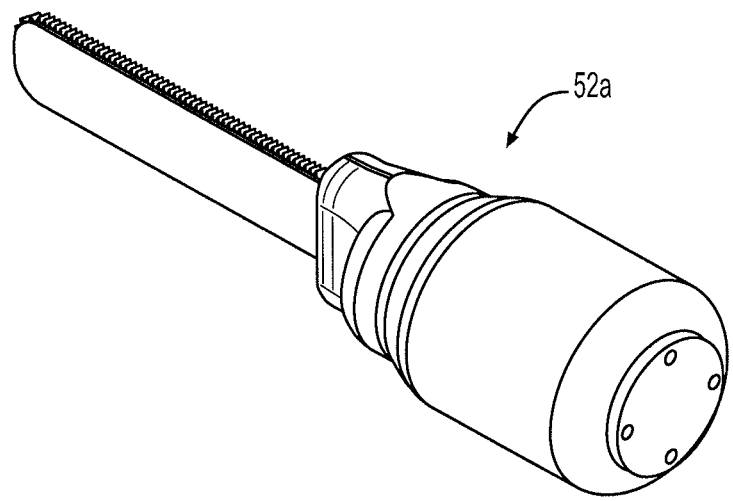
FIG. 6A is a perspective view of the tool of FIG. 5.
Figure 6B:
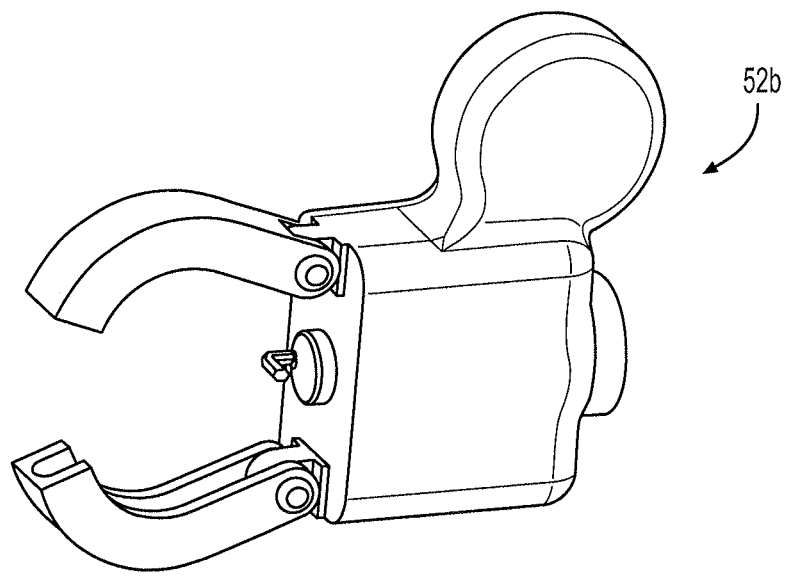
FIG. 6B is a perspective view of an alternative embodiment of the tool of FIG. 6A.
Figure 6C:
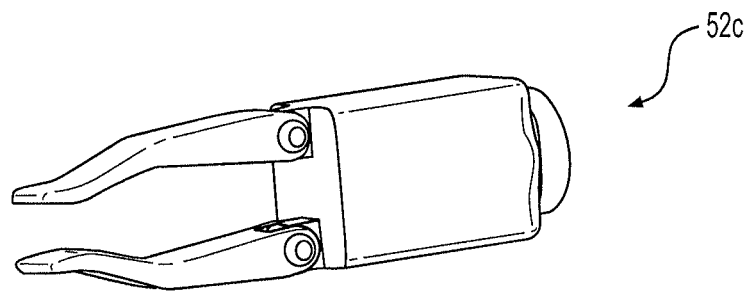
FIG. 6C is a perspective view of another alternative embodiment of the tool of FIG. 6A.
Figure 6D:
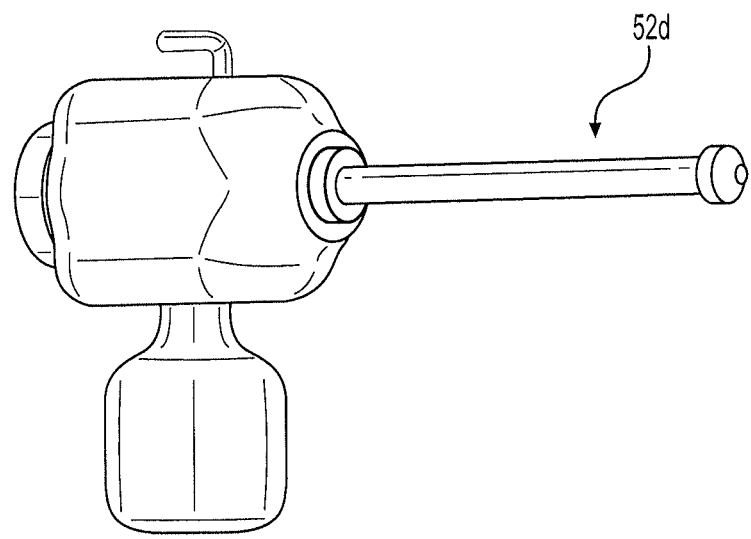
FIG. 6D is a perspective view of still another alternative embodiment of the tool of FIG. 6A.

As shown in FIGS. 3 and 5, a robotic arm 50 is mounted on the movable platform 28 for selectively operating and manipulating a tool 52a for performing tree harvesting and pre-harvesting operations. It should be understood that the robotic arm 50 is shown for exemplary purposes only, and may be any suitable type of robotic arm or remotely controlled actuator. Further, it should be understood that the tool 52a may be any suitable type of tool for performing harvesting or pre-harvesting operations. For example, FIGS. 5 and 6A show tool 52a as a conventional saw. Tool 52a may be replaced by any desired type of tool, depending upon the desired harvesting or pre-harvesting operation. The saw 52a may be replaced by the tools of FIG. 6B or 6C, which show two separate types of grippers 52b, 52c, respectively, or the tool of FIG. 6D, which shows a sprayer 52d for water, for cleaning or the like. The robotic arm 50 and the associated tools 52a, 52b, 52c, 52d may be controlled through interconnection with the controller 100. It should be understood that the robotic arm 50 and the associated tools 52a, 52b, 52c, 52d may be controlled through the use of any suitable type of interface 102, including body-mounted interfaces, joysticks, keyboards, touchscreens and the like, as are well known in the field of robotics and remote controlled devices. Cameras 54, 58 may be provided on the robotic arm 50 for transmitting images of the harvesting and pre-harvesting operations to controller 100, where they may be displayed to the user on a display 110.

The choice of tool is dependent upon the particular task being performed. As an example, if the task is harvesting date bunches, dethroning, thinning a palm date tree or post-harvesting, electrical saw 52a may be appropriate for such tasks. As a further example, if the task is bunch alignment, the two-fingered gripper 52b may be appropriate. If the task is bunch attachment, gripper 52b may again be appropriate, particularly for its wiring ability. In use, gripper 52b provides two fingers, each finger defines a path where a wire will pass to surround the part needed to be attached, then the attaching equipment will tie the wire to attach the needed part. As a further example, if the task is harvesting individual dates, the small gripper 52c may be appropriate to, for example, pick individual dates. As an additional example, if the task to be performed is pollination, dust removal or date spider removal, the sprayer tool 52d may be appropriate. The sprayer 52d may have an input for compressed air or water to spray on the palm, as well as a soap container to mix with the water if the task is date spider removal. The operator can select if soap or any other product is mixed with the input of the sprayer. In addition, the user can set the type of the nozzle to set the form of the spray.

Figure 7A:
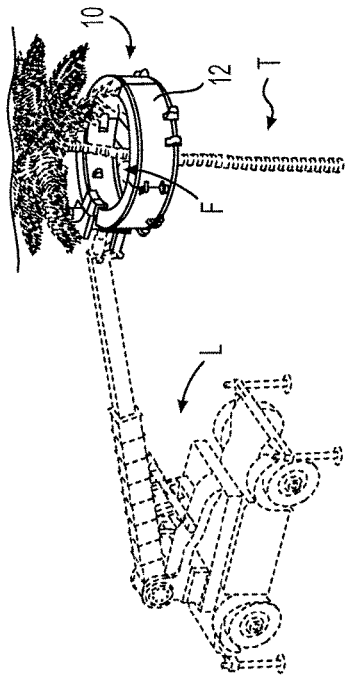
FIG. 7A, FIG. 7B, FIG. 7C, FIG. 7D and FIG. 7E sequentially illustrate operation of the tree harvesting tool to gather fruit from a fruit tree.
Figure 7B:
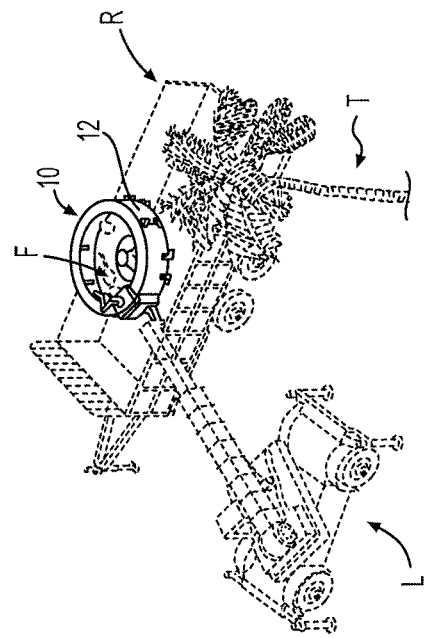
Figure 7C:
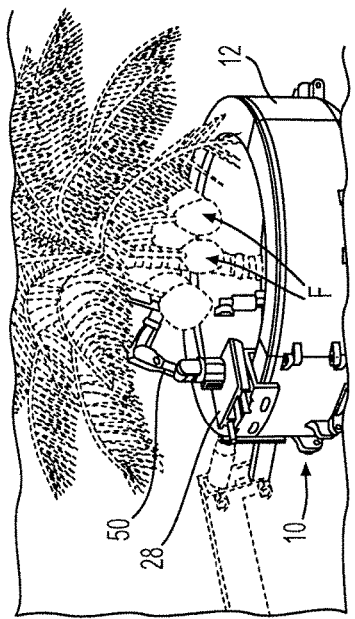
Figure 7D:
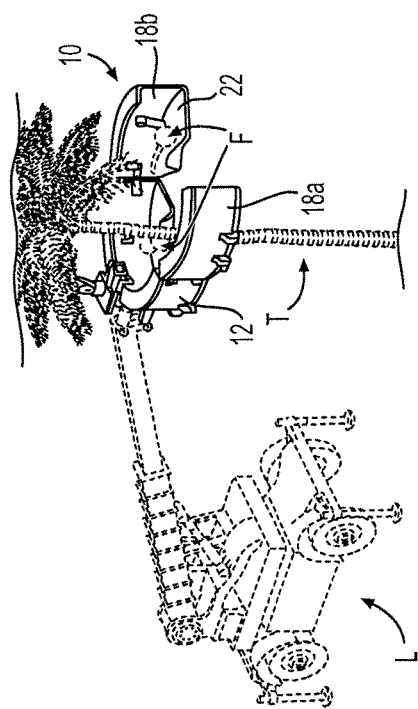
Figure 7E:
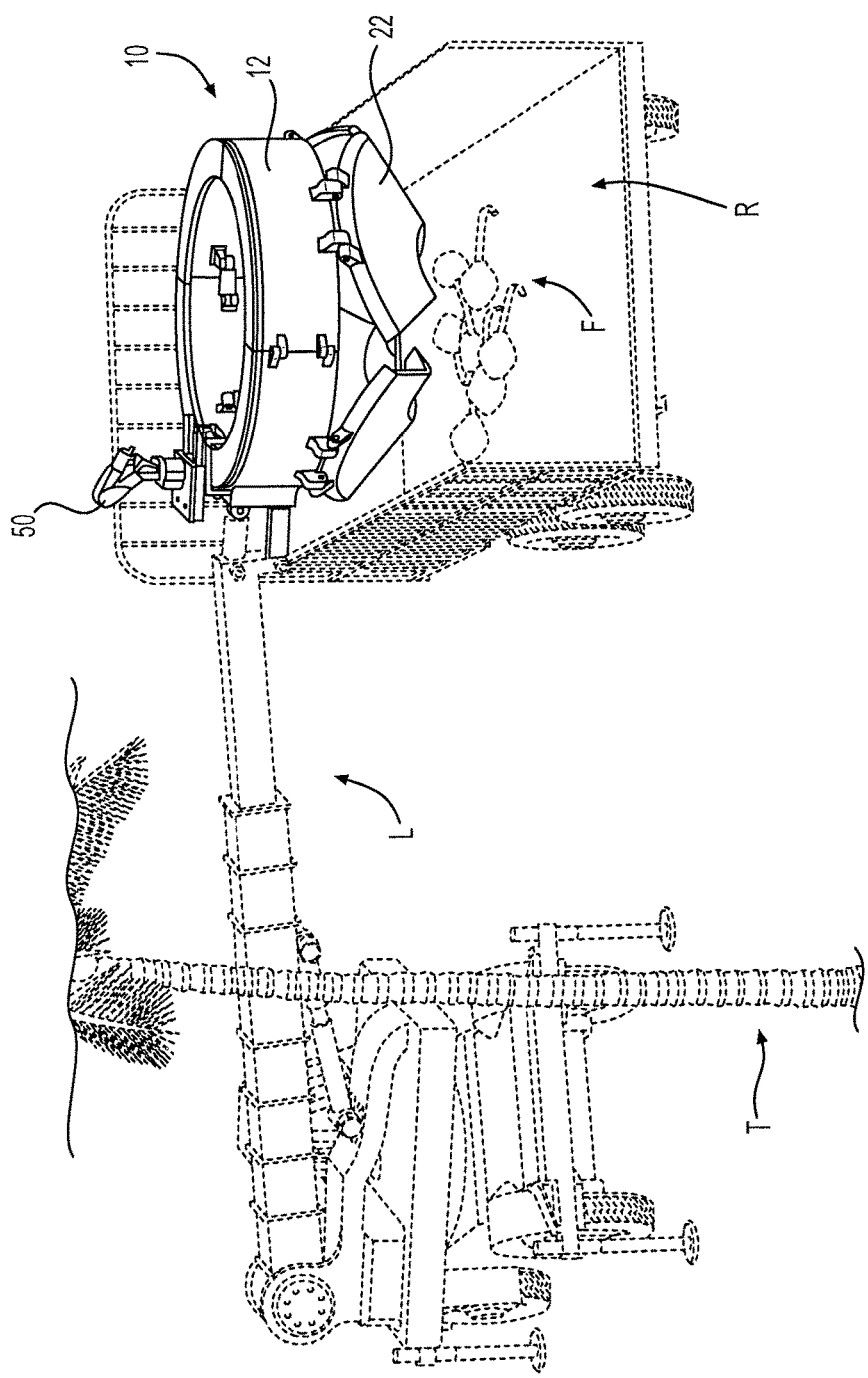

In use, doors 18a, 18b are opened, allowing the lifter L to position the tree harvesting tool 10 about the trunk of the tree T. The doors 18a, 18b are then closed with the trunk of the tree T passing through the central opening defined by panels 22, as shown in FIGS. 7A and 7B. Robotic arm 50 and the associated tools 52a, 52b, 52c, 52d are used to perform the harvesting or pre-harvesting operations on the tree T. In the example of FIG. 7B, fruit F is being removed from tree T for collection within a basket defined by the cylindrical shell 12 and the panels 22. Once the fruit F has been collected, doors 18a, 18b are opened again, as shown in FIG. 7C, allowing lifter L to pull the tree harvesting tool 10 away from tree T. In FIG. 7D, doors 18a, 18b are closed again, allowing lifter L to transport the tree harvesting tool 10 to a receptacle R for receipt of the fruit F. In this example, receptacle R is shown as being the back of a waiting truck, although it should be understood that the truck is shown for exemplary purposes only. Once properly positioned, as in FIG. 7E, the second hydraulic jacks 24 open panels 22, allowing the fruit F to be delivered into the waiting receptacle R.

Figure 8:
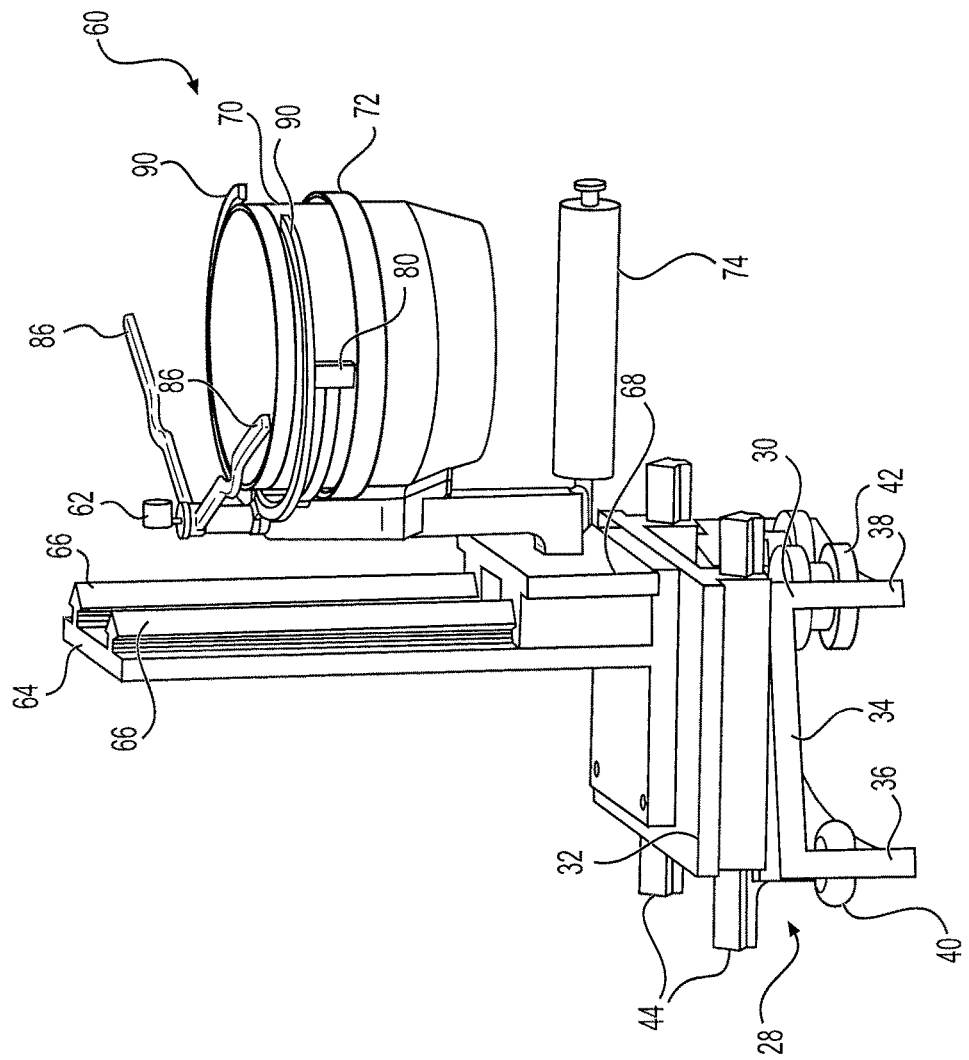
FIG. 8 is a perspective view of a fruit bagger mounted on the movable platform of FIG. 4.

In the alternative configuration of FIG. 8, robotic arm 50 has been replaced by a fruit bagger 60. Any suitable type of releasable attachment, such as screws, bolts, clamps or the like may be used to removably mount the robotic arm 50 and the fruit bagger 60 to the upper portion 32 of the movable platform 28. As shown in FIG. 8, the fruit bagger 60 includes a vertical support 64 having at least one vertical rail 66 and a sliding support 68 slidably mounted on the at least one vertical rail 66. A cylindrical bag shaper 70 is mounted on the sliding support 68 for encircling the fruit F hanging from the tree T. A supply of bagging material 74 is also mounted on the sliding support 68, such that the bagging material 74 may be wrapped around the cylindrical bag shaper 70 to form a bag for bagging the fruit F. A camera 62 may be provided for transmitting images of the bagging operation to the controller 100, where they may be displayed to the user on a display 110.

Figure 9A:
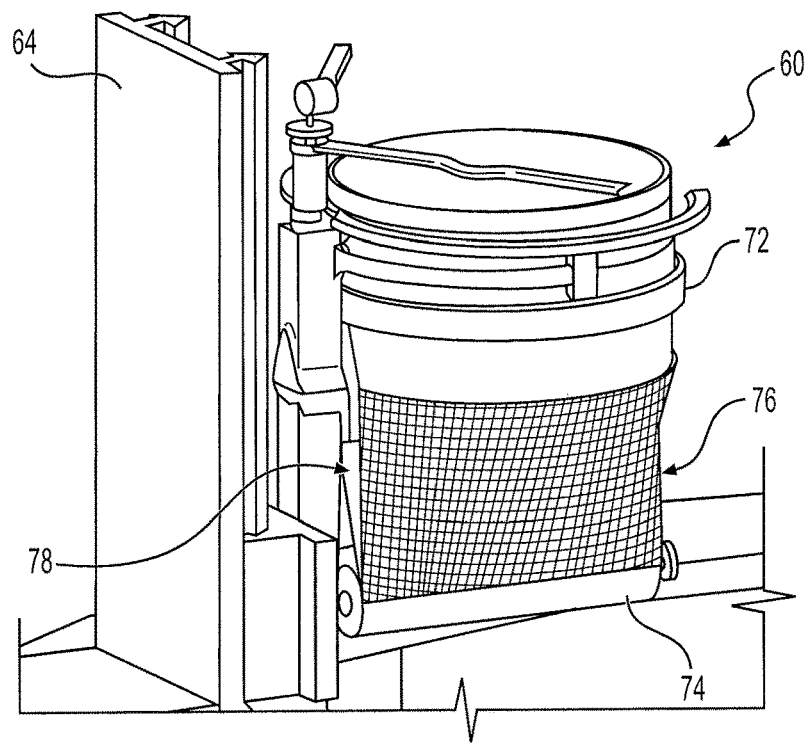
FIG. 9A, FIG. 9B, FIG. 9C, FIG. 9E, FIG. 9F, FIG. 9G, FIG. 9H, FIG. 9I, FIG. 9J and FIG. 9K sequentially illustrate operation of the fruit bagger of FIG. 8 to secure fruit hanging from the fruit tree in a bag.

In the example shown in FIGS. 8 and 9A, the bagging material 74 is shown provided in a roll. The bagging material 74 is initially manually unwound from the roll and manually pulled upward, as well as being manually wrapped around the cylindrical bag shaper 70. As shown, rather than being provided as a rolled single sheet of material, the bagging material 74 may be pre-folded, such that a two-layer folded strip is wrapped into the roll. As shown in FIG. 9A, when the bagging material 74 is unwound, it is unwound in its folded state, with the folded or closed end 76 positioned to the right (in the orientation of FIG. 9A), and the free end 78 (i.e., the two free edges which are opposite the vertically-extending fold) positioned to the left.

Figure 9B:
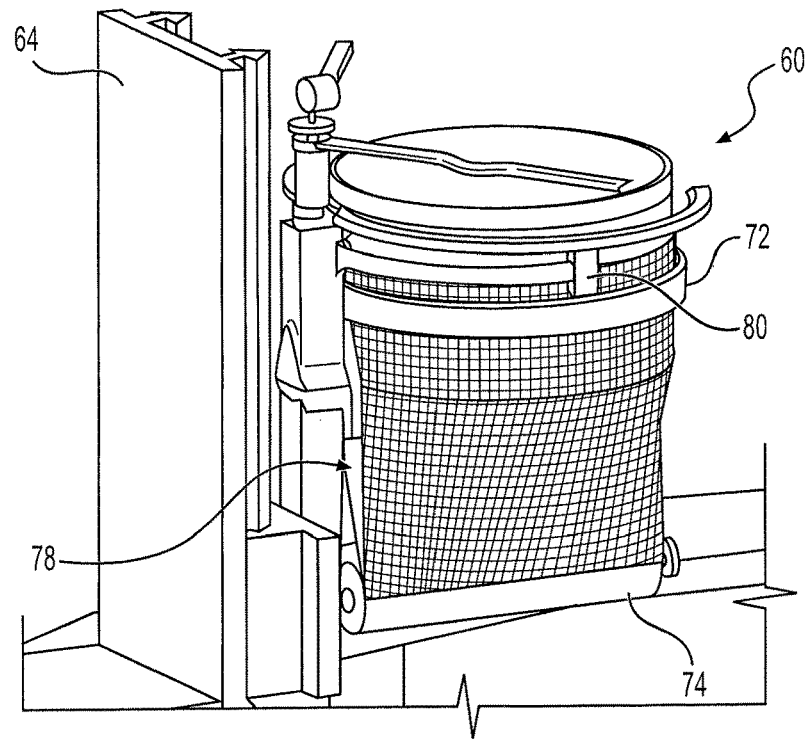
Figure 9C:
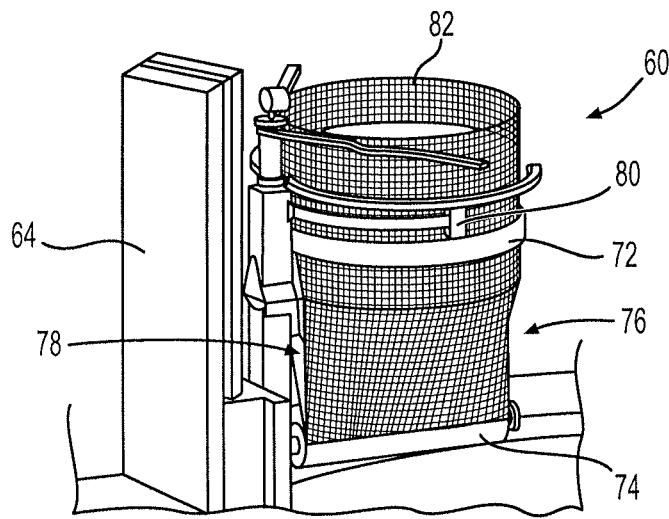

A circular guide 72 may be mounted about the cylindrical bag shaper 70 for guiding and securing the bagging material 74 as it is moved with respect to the cylindrical bag shaper 70, as shown in FIG. 9B. At least one driven roller 80 may be provided for selectively vertically adjusting the bagging material 74 on the cylindrical bag shaper 70, pulling it from the roll of the bagging material and moving the bagging material 74 upward until the upper edge 82 of the bagging material 74 is positioned above a top edge of the cylindrical bag shaper 70, as shown in FIG. 9C. Although only one driven roller 80 is shown in FIGS. 9B and 9C, it should be understood that at least a second driven roller 80 may be mounted at least diametrically opposite the visible roller 80. The driven rollers 80 may be actuated to selectively rotate through interconnection with the controller 100. Driven rollers 80 may be any suitable type of rollers, actuators or the like for gripping and pulling the bagging material 74 to move upward with respect to the cylindrical bag shaper 70.

Figure 9D:
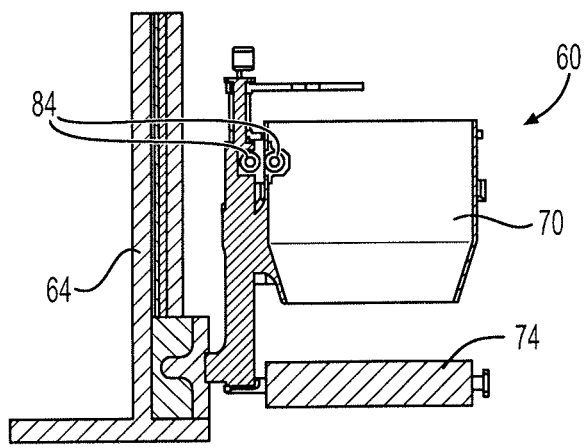
FIG. 9D is a side view in section of the fruit bagger of FIG. 8.

The bagging material 74 may be formed from a thermoplastic material, or any other type of suitable thermomelt material, such that the vertically-extending edges defining the free end 78 may be fused together through melting. In FIG. 9D, a pair of welders 84 are shown for melting, fusing and sealing the free end 78 as the bagging material 74 is moved upward with respect to the cylindrical bag shaper 70. It should be understood that any suitable type of melters, heaters, welders or the like may be used to melt, fuse and seal the free end 78 to form a continuous cylinder of bagging material 74 about the cylindrical bag shaper 70. The welders 84 may be controlled through interconnection with the controller 100.

Figure 9E:
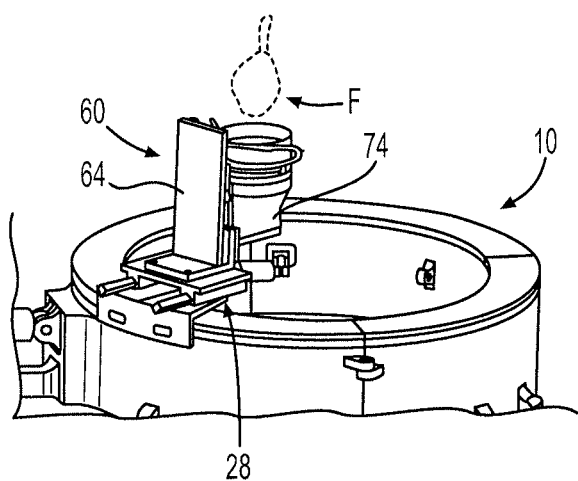
Figure 9F:
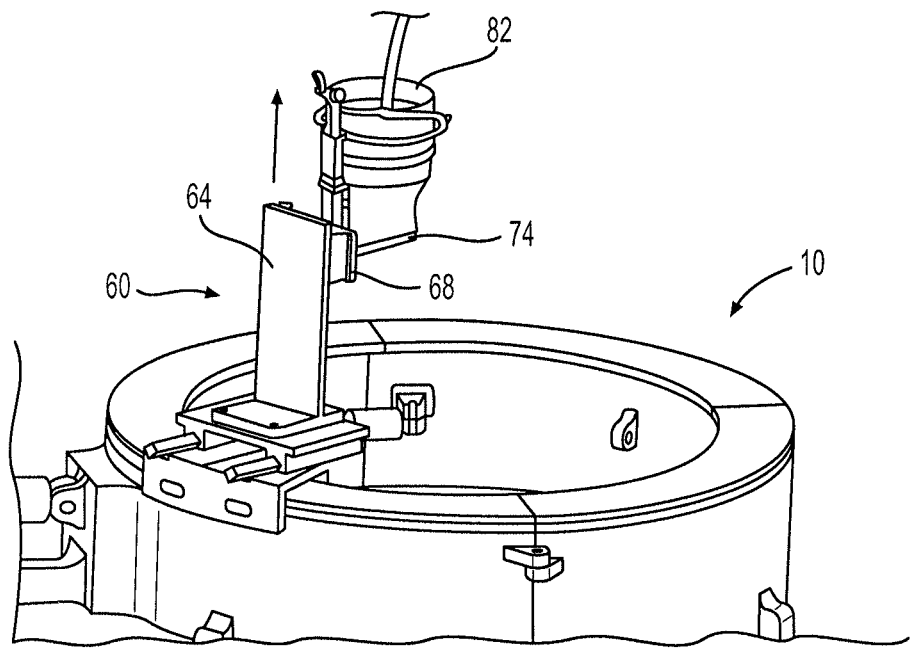

With the bagging material positioned as shown in FIG. 9C, and with the free end 78 sealed, the movable platform 28 can be used to position the fruit bagger 60 beneath hanging fruit F, as shown in FIG. 9E. As shown in FIG. 9F, the sliding support 68 is driven to vertically rise on the rails 66 of the vertical support 64 until the fruit F is contained within the cylinder of bagging material 74 and within the cylindrical bag shaper 70. It should be understood that any suitable type of motor, actuator or the like may be used to raise the sliding support 68. The movement of the sliding support 68 may be controlled through interconnection with the controller 100.

Figure 9G:
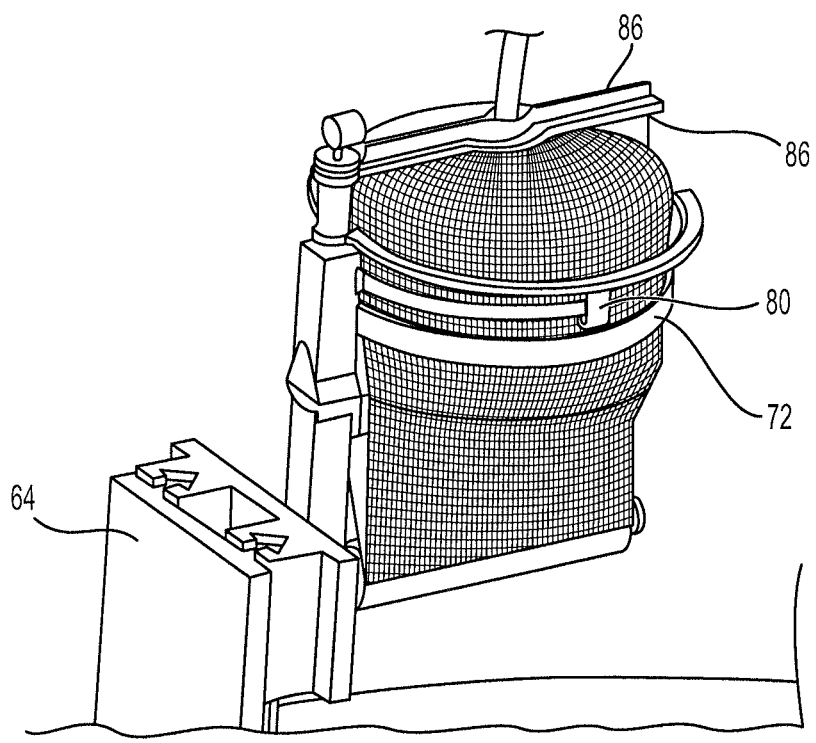

As shown in FIG. 9G, when the fruit F has been contained within the cylinder formed from the bagging material 74, and is contained within the cylindrical bag shaper 70, a pair of heated arms 86 are driven to clamp and seal an upper edge of the bag 74. As shown, the heated arms 86 may each have a central bend, allowing the stem of the fruit F to easily pass therethrough. The heated arms 86 may be actuated to selectively come together and retract by any suitable type of motor, actuator or the like, which may be controlled through interconnection with the controller 100. The heated arms 86 may use any suitable type of heating element or the like to melt the bagging material 74.

Figure 9H:
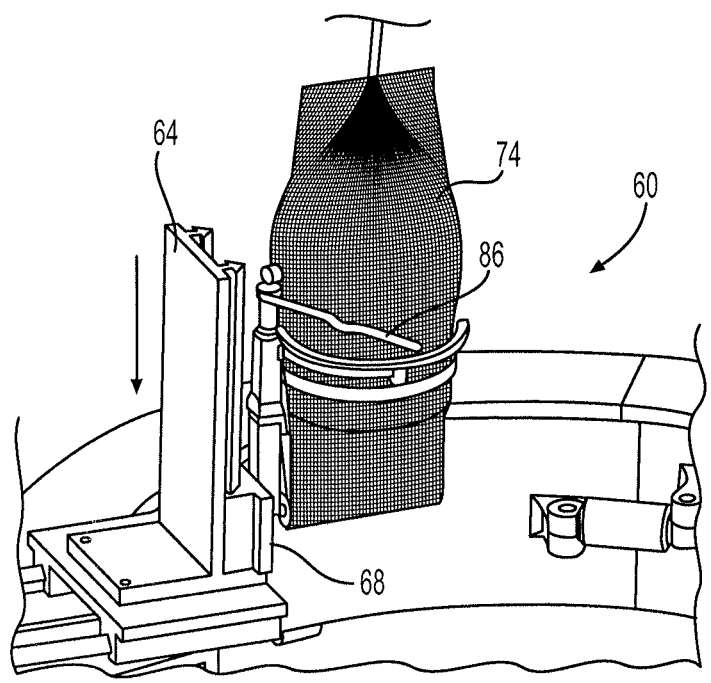
Figure 9I:
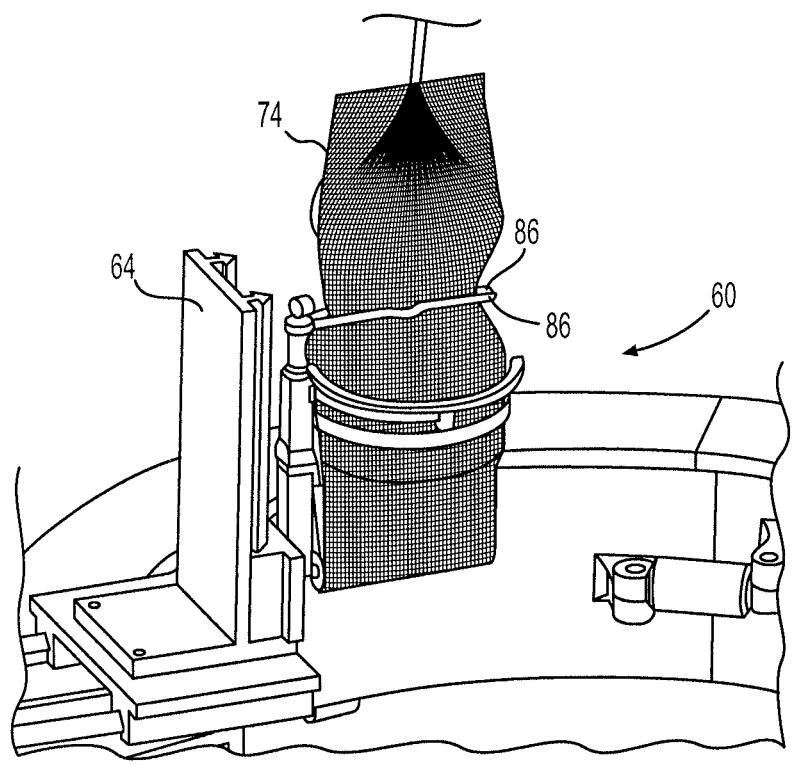
Figure 9J:
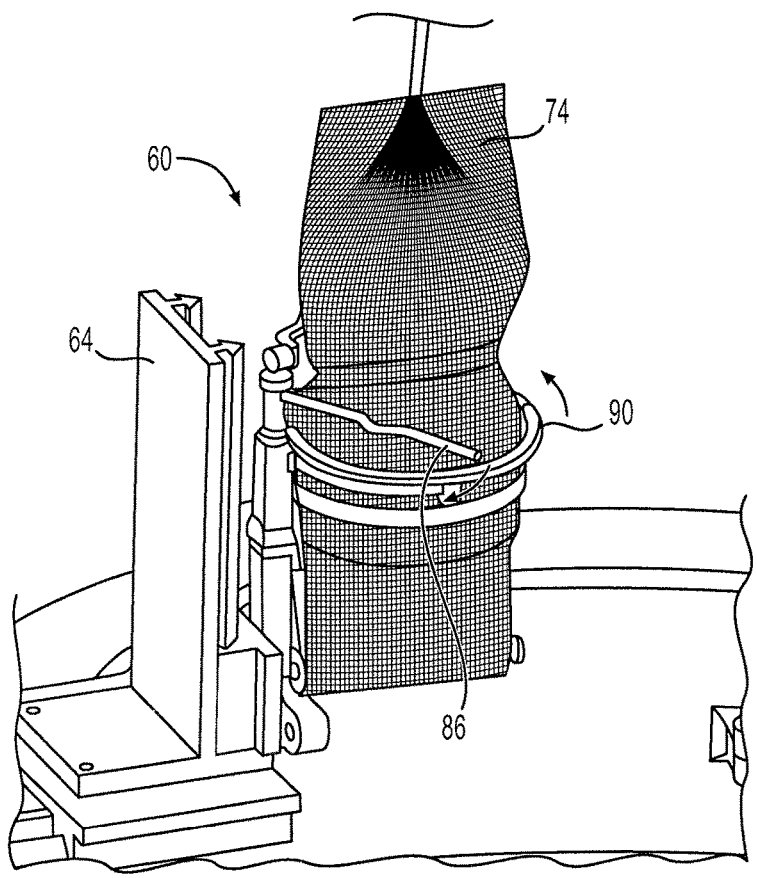
Figure 9K:
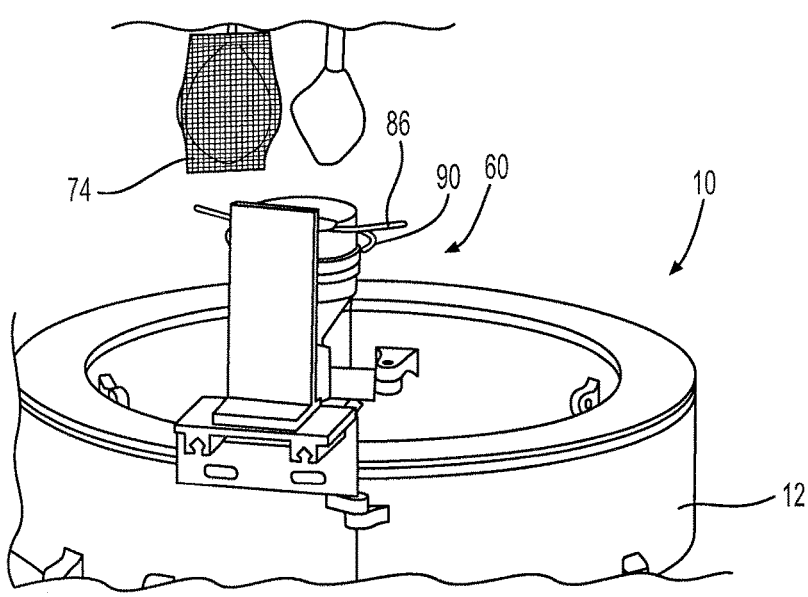

As shown in FIG. 9H, the sliding support 68 is driven to lower itself with respect to the vertical support 64, thus bringing a lower edge of the bag 74 into alignment with the pair of heated arms 86. The pair of heated arms 86 are again actuated to clamp and seal the lower edge of the bag, thus fully enclosing fruit F within the bag 74, as shown in FIG. 9I. As shown in FIGS. 9J and 9K, the pair of heated arms 86 are retracted and a pair of cutting arms 90 are actuated for selectively separating the bag 74 from the remainder of the bagging material, leaving the bagged fruit F hanging from tree T for later collection. The cutting arms may 90 be actuated to selectively come together and retract by any suitable type of motor, actuator or the like, which may be controlled through interconnection with the controller 100. The cutting arms 90 may use any suitable type of blade, cutter or the like for severing the bag 74 from the remainder of the bagging material.

It is to be understood that the tree harvesting tool is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A tree harvesting tool, comprising:
    a cylindrical shell having an upper end and a lower end, at least one portion of the cylindrical shell defining a door, the cylindrical shell being adapted for encircling a trunk of a tree;
    a plurality of panels pivotally secured to the lower end of the cylindrical shell defining an openable floor, the plurality of panels extending radially inward normal to the cylindrical shell and defining an opening concentric to the cylindrical shell for receiving the trunk of the tree;
    a circular track mounted on the upper end of the cylindrical shell;
    a movable platform mounted on the circular track, the movable platform being selectively movable on the circular track;
    a robotic arm mounted on the movable platform; and
    a tool mounted on the robotic arm, the tool being selectively operated and manipulated to perform tree harvesting operations.

2. The tree harvesting tool as recited in claim 1, further comprising at least one first hydraulic jack selectively opening and closing the at least one portion of the cylindrical shell defining the door.

3. The tree harvesting tool as recited in claim 2, further comprising a plurality of second hydraulic jacks for selectively pivoting the plurality of panels.

4. The tree harvesting tool as recited in claim 1, further comprising an attachment mechanism secured to the cylindrical shell, the attachment mechanism being adapted for releasable connection to a lifter.

5. The tree harvesting tool as recited in claim 1, wherein the movable platform comprises a lower portion and an upper portion, the lower portion extending on the circular track around the cylindrical shell, the upper portion being adjustable to move in a radial direction with respect to the lower portion.

6. The tree harvesting tool as recited in claim 5, wherein the lower portion of the movable platform comprises:
    a horizontally-extending plate; and
    first and second vertically-extending walls extending downward from the horizontally-extending plate, the first and second vertically-extending walls being spaced apart from one another to receive the circular track and at least a portion of the cylindrical shell therebetween.

7. The tree harvesting tool as recited in claim 6, wherein the lower portion of the movable platform further comprises at least one self-driving wheel rotatably mounted to the first vertically-extending wall and bearing against said cylindrical shell for selectively driving the movable platform around said cylindrical shell.

8. The tree harvesting tool as recited in claim 7, wherein the lower portion of the movable platform further comprises at least one roller wheel rotatably mounted to the second vertically-extending wall and bearing against said cylindrical shell on a side opposite said at least one self-driving wheel.

9. The tree harvesting tool as recited in claim 8, further comprising at least one rail mounted on the horizontally-extending plate of the lower portion of the movable platform, the upper portion of the movable platform being selectively slidable on the at least one rail.

10. The tree harvesting tool as recited in claim 1, wherein the tool comprises a gripper.

11. The tree harvesting tool as recited in claim 1, wherein the tool comprises a saw.

12. The tree harvesting tool as recited in claim 1, wherein the tool comprises a sprayer.

13. A tree harvesting tool, comprising:
   a cylindrical shell having an upper end and a lower end, at least one portion of the cylindrical shell defining a door, the cylindrical shell being adapted for encircling a trunk of a tree;
   a plurality of panels pivotally secured to the lower end of the cylindrical shell defining an openable floor, the plurality of panels extending radially inward normal to the cylindrical shell and defining an opening concentric to the cylindrical shell for receiving the trunk of the tree;
   a circular track mounted on the upper end of the cylindrical shell;
   a movable platform mounted on the circular track and being selectively movable thereon; and
   a fruit bagger mounted on the movable platform for bagging fruit hanging from the tree.

14. The tree harvesting tool as recited in claim 13, wherein the fruit bagger comprises:
   a vertical support having at least one vertical rail;
   a sliding support slidably mounted on the at least one vertical rail;
   a cylindrical bag shaper mounted on the sliding support, the cylindrical bag shaper being adapted for encircling the fruit hanging from the tree; and
   a supply of bagging material mounted on the sliding support, the bagging material being adapted for wrapping around the cylindrical bag shaper to form a bag.

15. The tree harvesting tool as recited in claim 14, wherein the fruit bagger further comprises at least one driven roller for selectively vertically adjusting the bagging material on the cylindrical bag shaper.

16. The tree harvesting tool as recited in claim 15, wherein the bagging material comprises a thermoplastic material.

17. The tree harvesting tool as recited in claim 16, wherein the fruit bagger further comprises at least one welder selectively fusing and sealing a vertically extending edge of the bag.

18. The tree harvesting tool as recited in claim 17, wherein the fruit bagger further comprises a pair of heated arms selectively clamping and sealing an upper edge of the bag.

19. The tree harvesting tool as recited in claim 18, wherein the pair of heated arms selectively clamp and seal a lower edge of the bag.

20. The tree harvesting tool as recited in claim 19, wherein the fruit bagger further comprises a pair of cutting arms selectively separating the bag from the supply of bagging material.

* * * * *